United States Patent
Slater

(10) Patent No.: US 8,566,956 B2
(45) Date of Patent: Oct. 22, 2013

(54) MONITORING AND REPORTING OF DATA ACCESS BEHAVIOR OF AUTHORIZED DATABASE USERS

(75) Inventor: Steve Slater, Alamo, CA (US)

(73) Assignee: salesforce.com, inc., San Francisco, CA (US)

( * ) Notice: Subject to any disclaimer, the term of this patent is extended or adjusted under 35 U.S.C. 154(b) by 294 days.

(21) Appl. No.: 12/961,020

(22) Filed: Dec. 6, 2010

(65) Prior Publication Data

US 2011/0321175 A1 Dec. 29, 2011

Related U.S. Application Data

(60) Provisional application No. 61/357,961, filed on Jun. 23, 2010.

(51) Int. Cl.
*G06F 7/04* (2006.01)

(52) U.S. Cl.
USPC .......................................... 726/28; 707/709

(58) Field of Classification Search
None
See application file for complete search history.

(56) References Cited

U.S. PATENT DOCUMENTS

| | | | |
|---|---|---|---|
| 5,577,188 A | 11/1996 | Zhu | |
| 5,608,872 A | 3/1997 | Schwartz et al. | |
| 5,649,104 A | 7/1997 | Carleton et al. | |
| 5,715,450 A | 2/1998 | Ambrose et al. | |
| 5,761,419 A | 6/1998 | Schwartz et al. | |
| 5,819,038 A | 10/1998 | Carleton et al. | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 6,092,083 A | 7/2000 | Brodersen et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,135 B1 | 4/2001 | Brodersen et al. | |
| 6,233,617 B1 | 5/2001 | Rothwein et al. | |
| 6,266,669 B1 | 7/2001 | Brodersen et al. | |
| 6,295,530 B1 | 9/2001 | Ritchie et al. | |
| 6,324,568 B1 | 11/2001 | Diec et al. | |
| 6,324,693 B1 | 11/2001 | Brodersen et al. | |
| 6,336,137 B1 | 1/2002 | Lee et al. | |
| D454,139 S | 3/2002 | Feldcamp et al. | |
| 6,367,077 B1 | 4/2002 | Brodersen et al. | |
| 6,393,605 B1 | 5/2002 | Loomans | |
| 6,405,220 B1 | 6/2002 | Brodersen et al. | |
| 6,434,550 B1 | 8/2002 | Warner et al. | |
| 6,446,089 B1 | 9/2002 | Brodersen et al. | |
| 6,535,909 B1 | 3/2003 | Rust | |
| 6,549,908 B1 | 4/2003 | Loomans | |
| 6,553,563 B2 | 4/2003 | Ambrose et al. | |
| 6,560,461 B1 | 5/2003 | Fomukong et al. | |

(Continued)

*Primary Examiner* — Fikremariam A Yalew
(74) *Attorney, Agent, or Firm* — Ingrassia Fisher & Lorenz, P.C.

(57) ABSTRACT

A computer-implemented system and method of monitoring data access activity of a user of a system is presented here. The method maintains a respective score for each of a plurality of monitored data access events, resulting in a set of scores for the user. The method continues by monitoring behavior of the user to detect occurrences of the monitored data access events, and updating the set of scores in response to detected occurrences of the monitored data access events. The method initiates an appropriate course of action when the updated set of scores is indicative of unauthorized, suspicious, or illegitimate data access activity.

13 Claims, 5 Drawing Sheets

(56) References Cited

U.S. PATENT DOCUMENTS

| | | |
|---|---|---|
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 * | 2/2005 | Warner et al. .................... 1/1 |
| 7,340,411 B2 | 3/2008 | Cook |
| 7,433,960 B1 * | 10/2008 | Dube et al. .................... 709/229 |
| 7,530,106 B1 * | 5/2009 | Zaitsev et al. .................... 726/24 |
| 7,620,655 B2 | 11/2009 | Larsson et al. |
| 7,631,362 B2 * | 12/2009 | Ramsey .................... 726/27 |
| 7,698,160 B2 | 4/2010 | Beaven et al. |
| 7,865,958 B2 * | 1/2011 | Lieblich et al. .................... 726/25 |
| 8,082,301 B2 | 12/2011 | Ahlgren et al. |
| 8,095,413 B1 | 1/2012 | Beaven |
| 8,095,594 B2 | 1/2012 | Beaven et al. |
| 8,256,004 B1 * | 8/2012 | Hill et al. .................... 726/25 |
| 8,275,836 B2 | 9/2012 | Beaven et al. |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2007/0244750 A1 * | 10/2007 | Grannan et al. .................... 705/14 |
| 2008/0215667 A1 * | 9/2008 | Rothbarth et al. .................... 709/202 |
| 2010/0251369 A1 * | 9/2010 | Grant .................... 726/23 |
| 2011/0185436 A1 * | 7/2011 | Koulinitch et al. .................... 726/28 |
| 2012/0317089 A1 * | 12/2012 | Randall .................... 707/709 |

* cited by examiner

US 8,566,956 B2

MONITORING AND REPORTING OF DATA ACCESS BEHAVIOR OF AUTHORIZED DATABASE USERS

CROSS-REFERENCE TO RELATED APPLICATION(S)

This application claims the benefit of U.S. provisional patent application Ser. No. 61/357,961, filed Jun. 23, 2010, the entire content of which is incorporated by reference herein.

TECHNICAL FIELD

Embodiments of the subject matter described herein relate generally to data processing systems and processes, such as systems and processes that use a common network-based platform to support applications executing on behalf of multiple tenants. More particularly, embodiments of the subject matter relate to the monitoring of data access behavior of authorized users of a data processing system.

BACKGROUND

Modern software development is evolving away from the client-server model toward network-based processing systems that provide access to data and services via the Internet or other networks. In contrast to traditional systems that host networked applications on dedicated server hardware, a "cloud" computing model allows applications to be provided over the network "as a service" supplied by an infrastructure provider. The infrastructure provider typically abstracts the underlying hardware and other resources used to deliver a customer-developed application so that the customer no longer needs to operate and support dedicated server hardware. The cloud computing model can often provide substantial cost savings to the customer over the life of the application because the customer no longer needs to provide dedicated network infrastructure, electrical and temperature controls, physical security and other logistics in support of dedicated server hardware.

A customer relationship management (CRM) system is one example of an application that is suitable for deployment as a cloud-based service. A business, company, or entity using such a CRM system might be concerned about access to the CRM data maintained by the CRM system, even by users who have proper authentication credentials for the CRM system. For example, it may be desirable to monitor user behavior patterns and trends associated with certain data access events to predict and respond to abusive, fraudulent, or unauthorized access to data.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Figure 1:
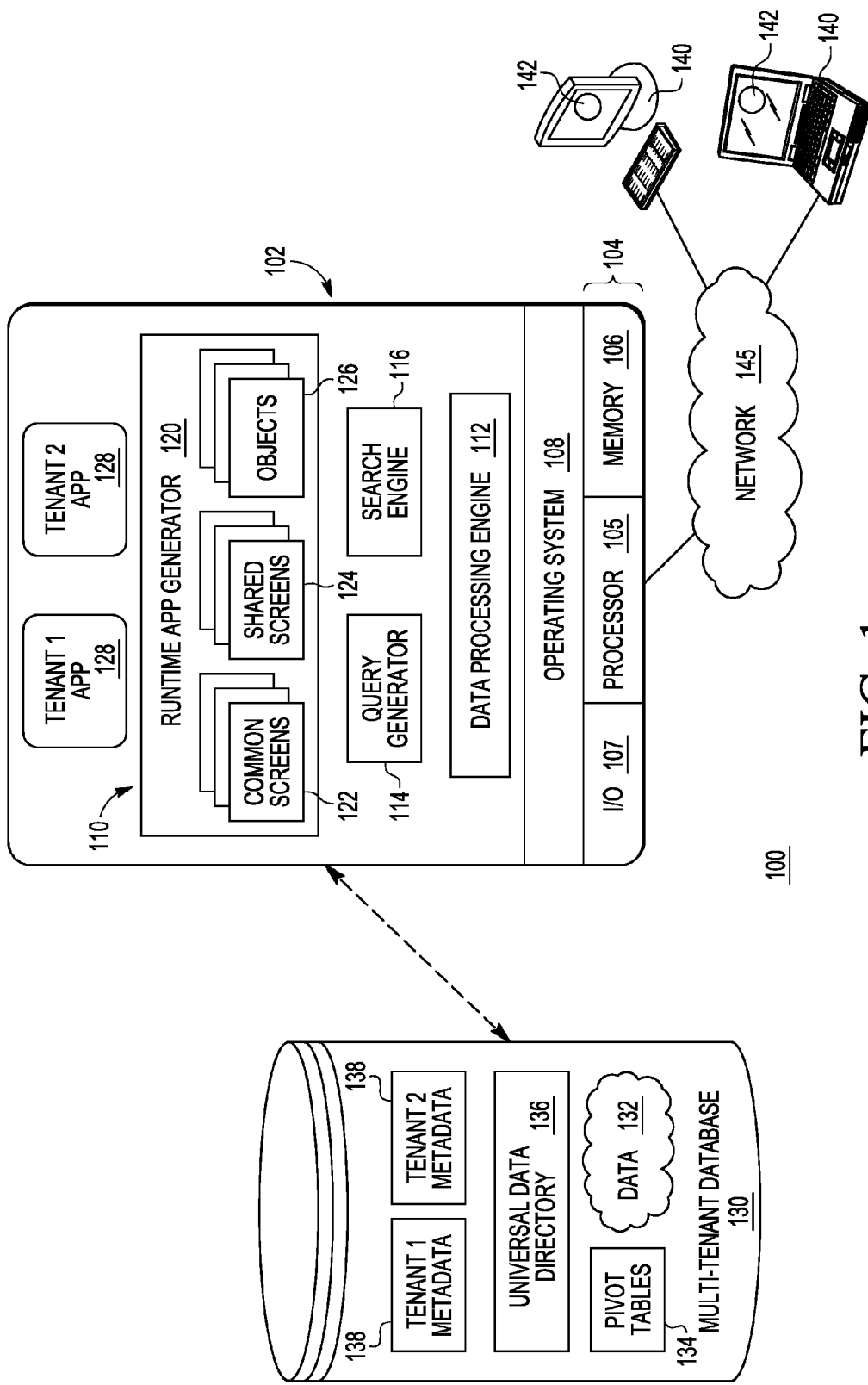
FIG. 1 is a block diagram of an exemplary multi-tenant data processing system.

The exemplary embodiments presented here relate to various fraud detection, data security, and loss prevention techniques and technologies, particularly in a computer-implemented database system environment. In this regard, it is desirable to know if people are accessing, changing, and/or copying data (even though the people might have authorized access to such data). It is also important to know when people are accessing or manipulating data that they should not be accessing. Current anti-fraud solutions and techniques are limited and are typically based on metrics such as login activity (login frequency, location, or number of failed attempts) and transactional activity (moving money, wire transfers, or ledger activities).

There are certain situations where user access is allowed, but abuse and other designated types of activity must still be monitored. In this context, "abuse" could be defined as: viewing or modifying too much data; accessing data that is not related to a user's defined job requirements (snooping); theft of data; or unauthorized copying of data. The techniques and system described here monitor users for abusive behavior in an efficient and effective manner. The exemplary embodiment described here employs counters, weighting factors, and analysis formulas based on data access events. Although a CRM system and CRM terminology are mentioned here, the concept can be extended to other applications and implementations.

In certain embodiments, a list of counters or scores are created and maintained for each user. Each type of data object that a user may access has its own unique counter. When a user views a record of a particular type, the appropriate counter is incremented and selected linked data is saved. Incrementing a counter can be done sequentially (e.g., incrementing the counter from one to two), in a weighted manner (i.e., the counter is incremented by a different number or percentage based on the context of the access), or in some other way. For example, in a CRM system, when a user views a contact, the system increments the respective counter and saves the related account identifier. When the user views another contact related to the same account, the system can determine that the two contacts are related and, therefore, the counter need not be incremented as much as it would if they were two unrelated contacts. As another example, viewing a report of multiple contacts might count as the sum of the reports, possibly subject to a weighting factor as described below. As yet another example, exporting a report may increment the counter as the sum of the reports, but with a different weighting because the data is being removed for offline viewing. The system could maintain a running tally or score for each object type that will be incremented with each data access. In one implementation, the counters or scores are saved on a daily basis (or at any appropriate time) to allow for historical trending and anomaly detection.

Any type of CRM system object, user interaction, or data access event can be monitored. A default implementation might include counters maintained individually for each object type, such that an aggregate score can be calculated by using a weighted average. The system administrator may modify the weights to add more relevance to those objects they deem more sensitive. For example, an object may be associated with any of the following, without limitation: contacts; leads; accounts; or opportunities. In practice, the system can be suitably configured or initialized to enable any object (or set of objects) for monitoring, and to enable fraud detection for any custom object type.

An exemplary embodiment of the system is designed to monitor various actions, activities, event types, and the like. For each action, the respective score is incremented in accordance with a weighting factor specific to that action. The weighting factors are customizable by the system administrator in some embodiments. The following is a list of some exemplary actions and their respective weighted scores (this list is not intended to be exhaustive or otherwise limiting): view a record (increment score by ten); a record is shown to the user as part of a list view (increment score by one); a record is shown to the user as part of a report (increment score by one); a record is exported (increment score by four).

The weighting scheme utilized by the system may be modified by the customer if so desired. As a result, the system may implement many possible weighting factors. In practice, the system may have some assigned default values, which can be modified based on customer preferences and risk profiles.

As an example, a base score (such as ten points) for the user may be added for the first occurrence of a monitored data access event. Access to an object related to an already-visited object may count for less, perhaps only two points. Thus, if Contact A belongs to the same account as Contact B, then access to Contact A would count ten points, while access to Contact B would only count two points. Similarly, access to an object within the same geography or vertical as the user may count for less, e.g., seven points. For example, if Lead A is in a particular territory, and if Lead B is also in the same territory, the count may be only seven points instead of ten. The same approach may apply if the user is assigned to a certain vertical (financial, healthcare).

As another example, access that is included in a report or a view may count for less, because the data is contained in a single bulk report. However, that event should still be counted because the user sees many attributes of the object. Thus, this type of event might have a count of three points associated therewith. If a user downloads the report, that download event may count more heavily because the data is being exported (perhaps six points for each download).

The system can track access scores over time, save counts or scores on a daily basis, and, after a period of many days or weeks, averages can be determined Reports can be charted for each user to give management a visual insight into user activities. In certain embodiments, each day's individual scores are aggregated into a total score for that day. In addition, the raw number of records viewed per day might be saved for reporting. In this regard, any or all of the following reports could be generated (without limitation): daily and trend reports for all items; overall scores for the company; scores for each user; scores for each organization chart team; scores for each geographic region of users; scores above thresholds; and users that have triggered alerts.

Notably, the daily scores can be used to calculate a moving average, a user profile, or any appropriate baseline over any designated period of time, such as a four month moving window. After a baseline is established, the system can start watching for daily spikes or large deviations from that baseline. Accordingly, in certain embodiments, the system includes some type of learning and training methodology. The system may support a monitor mode and an action mode to enable the customer administrator to observe user behavior while they fine-tune the thresholds. Any new user should have a monitor or initialization period while the system learns the user's typical behavior and data access patterns, and builds up a standard usage profile.

In addition, alerts or other actions can be taken based on the scores (as compared to baseline scores). For instance, one implementation may generate a Level 1 Alert when the user's daily score is greater than one standard deviation from the thirty day moving average, generate a Level 2 Alert when the daily score is greater than two standard deviations, generate a Level 3 Alert when the daily score is greater than two standard deviations, and generate a Level 4 Alert based on values exceeding a pre-defined score set by the customer (e.g., a count greater than one thousand in any one day).

Possible actions include, without limitation:

Level 1 Alert: daily report to system administrator or the user's manager.

Level 2 Alert: real-time alert to system administrator or manager.

Level 3 Alert: prohibit the export of data until the administrator or manager gives an approval.

Level 4 Alert: lock out the user until freed by administrator or manager.

These examples are merely some possibilities and, in practice, the customer may have the ability to configure and fine tune the actions and thresholds needed to trigger the actions.

Turning now to FIG. 1, an exemplary multi-tenant application system 100 suitably includes a server 102 that dynamically creates virtual applications 128 based upon data 132 from a common database 130 that is shared between multiple tenants. Data and services generated by the virtual applications 128 are provided via a network 145 to any number of client devices 140, as desired. Each virtual application 128 is suitably generated at run-time using a common application platform 110 that securely provides access to the data 132 in the database 130 for each of the various tenants subscribing to the system 100. In accordance with one non-limiting example, the system 100 may be implemented in the form of a multi-tenant CRM system that can support any number of authenticated users of multiple tenants.

A "tenant" generally refers to a group of users that shares access to common data within the database 130. Tenants may represent customers, customer departments, business or legal organizations, and/or any other entities that maintain data for particular sets of users within the system 100. Although multiple tenants may share access to the server 102 and the database 130, the particular data and services provided from the server 102 to each tenant can be securely isolated from those provided to other tenants. The multi-tenant architecture therefore allows different sets of users to share functionality without necessarily sharing any of the data 132.

The database 130 is any sort of repository or other data storage system capable of storing and managing the data 132 associated with any number of tenants. The database 130 may be implemented using any type of conventional database server hardware. In various embodiments, the database 130 shares processing hardware 104 with the server 102. In other embodiments, the database 130 is implemented using separate physical and/or virtual database server hardware that communicates with the server 102 to perform the various functions described herein.

The data 132 may be organized and formatted in any manner to support the application platform 110. In various embodiments, the data 132 is suitably organized into a relatively small number of large data tables to maintain a semi-amorphous "heap"-type format. The data 132 can then be organized as needed for a particular virtual application 128. In various embodiments, conventional data relationships are established using any number of pivot tables 134 that establish indexing, uniqueness, relationships between entities, and/or other aspects of conventional database organization as desired.

Further data manipulation and report formatting is generally performed at run-time using a variety of metadata constructs. Metadata within a universal data directory (UDD) 136, for example, can be used to describe any number of forms, reports, workflows, user access privileges, business logic and other constructs that are common to multiple tenants. Tenant-specific formatting, functions and other constructs may be maintained as tenant-specific metadata 138 for each tenant, as desired. Rather than forcing the data 132 into an inflexible global structure that is common to all tenants and applications, the database 130 is organized to be relatively amorphous, with the pivot tables 134 and the metadata 138 providing additional structure on an as-needed basis. To that end, the application platform 110 suitably uses the pivot tables 134 and/or the metadata 138 to generate "virtual" components of the virtual applications 128 to logically obtain, process, and present the relatively amorphous data 132 from the database 130.

The server 102 is implemented using one or more actual and/or virtual computing systems that collectively provide the dynamic application platform 110 for generating the virtual applications 128. The server 102 operates with any sort of conventional processing hardware 104, such as a processor 105, memory 106, input/output features 107 and the like. The processor 105 may be implemented using one or more of microprocessors, microcontrollers, processing cores and/or other computing resources spread across any number of distributed or integrated systems, including any number of "cloud-based" or other virtual systems. The memory 106 represents any non-transitory short or long term storage capable of storing programming instructions for execution on the processor 105, including any sort of random access memory (RAM), read only memory (ROM), flash memory, magnetic or optical mass storage, and/or the like. The input/output features 107 represent conventional interfaces to networks (e.g., to the network 145, or any other local area, wide area or other network), mass storage, display devices, data entry devices and/or the like. In a typical embodiment, the application platform 110 gains access to processing resources, communications interfaces and other features of the processing hardware 104 using any sort of conventional or proprietary operating system 108. As noted above, the server 102 may be implemented using a cluster of actual and/or virtual servers operating in conjunction with each other, typically in association with conventional network communications, cluster management, load balancing and other features as appropriate.

The application platform 110 is any sort of software application or other data processing engine that generates the virtual applications 128 that provide data and/or services to the client devices 140. The virtual applications 128 are typically generated at run-time in response to queries received from the client devices 140. For the illustrated embodiment, the application platform 110 includes a bulk data processing engine 112, a query generator 114, a search engine 116 that provides text indexing and other search functionality, and a runtime application generator 120. Each of these features may be implemented as a separate process or other module, and many equivalent embodiments could include different and/or additional features, components or other modules as desired.

The runtime application generator 120 dynamically builds and executes the virtual applications 128 in response to specific requests received from the client devices 140. The virtual applications 128 created by tenants are typically constructed in accordance with the tenant-specific metadata 138, which describes the particular tables, reports, interfaces and/or other features of the particular application. In various embodiments, each virtual application 128 generates dynamic web content that can be served to a browser or other client program 142 associated with its client device 140, as appropriate.

The runtime application generator 120 suitably interacts with the query generator 114 to efficiently obtain multi-tenant data 132 from the database 130 as needed. In a typical embodiment, the query generator 114 considers the identity of the user requesting a particular function, and then builds and executes queries to the database 130 using system-wide metadata 136, tenant specific metadata 138, pivot tables 134, and/or any other available resources. The query generator 114 in this example therefore maintains security of the common database 130 by ensuring that queries are consistent with access privileges granted to the user that initiated the request.

The data processing engine 112 performs bulk processing operations on the data 132 such as uploads or downloads, updates, online transaction processing, and/or the like. In many embodiments, less urgent bulk processing of the data 132 can be scheduled to occur as processing resources become available, thereby giving priority to more urgent data processing by the query generator 114, the search engine 116, the virtual applications 128, etc. In certain embodiments, the data processing engine 112 and the processor 105 cooperate in an appropriate manner to perform and manage the various data access monitoring techniques, processes, and methods described in more detail below with reference to FIGS. 2-5.

In operation, developers use the application platform 110 to create data-driven virtual applications 128 for the tenants that they support. Such virtual applications 128 may make use of interface features such as tenant-specific screens 124, universal screens 122 or the like. Any number of tenant-specific and/or universal objects 126 may also be available for integration into tenant-developed virtual applications 128. The data 132 associated with each virtual application 128 is provided to the database 130, as appropriate, and stored until it is requested or is otherwise needed, along with the metadata 138 that describes the particular features (e.g., reports, tables, functions, etc.) of that particular tenant-specific virtual application 128.

The data and services provided by the server 102 can be retrieved using any sort of personal computer, mobile telephone, tablet or other network-enabled client device 140 on the network 145. Typically, the user operates a conventional browser or other client program 142 to contact the server 102 via the network 145 using, for example, the hypertext transport protocol (HTTP) or the like. The user typically authenticates his or her identity to the server 102 to obtain a session identifier ("SessionID") that identifies the user in subsequent communications with the server 102. When the identified user requests access to a virtual application 128, the runtime application generator 120 suitably creates the application at run time based upon the metadata 138, as appropriate. The query generator 114 suitably obtains the requested data 132 from the database 130 as needed to populate the tables, reports or other features of the particular virtual application 128. As noted above, the virtual application 128 may contain Java, ActiveX, or other content that can be presented using conventional client software running on the client device 140; other embodiments may simply provide dynamic web or other content that can be presented and viewed by the user, as desired.

Figure 2:
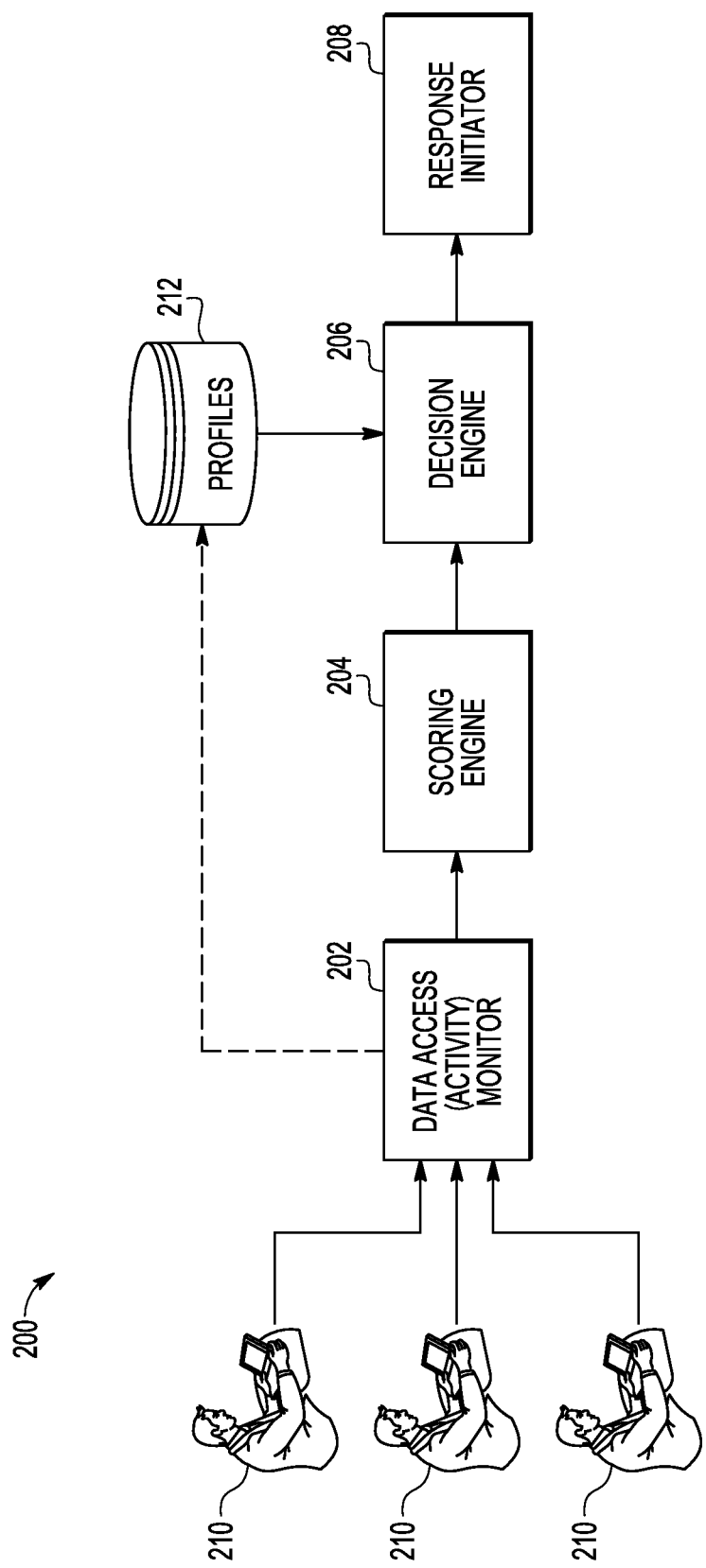
FIG. 2 is a block diagram that illustrates data access monitoring functionality of a database system.

FIG. 2 is a block diagram that illustrates data access monitoring functionality of a database system 200. Although not depicted in FIG. 2, the database system 200 could be deployed in the context of a multi-tenant application system, such as the system 100. Moreover, FIG. 2 depicts functional modules that might be realized using, for example, one or more processors, a data processing engine, or other computer-implemented logic resident at the database system 200. The illustrated embodiment of the database system 200 generally includes, without limitation: a data access or user activity monitor 202; a scoring engine 204; a decision engine 206; and a response initiator 208. These functional modules of the database system 200 are operatively associated with one another, and may be coupled together using any suitable interconnection arrangement or architecture that accommodates data communication as needed.

The data access monitor 202 is operatively associated with at least one database (not shown in FIG. 2) that stores data accessible to one or more users 210. The database associated with the data access monitor 202 may be, for example, a multi-tenant database of the type described above with reference to FIG. 1. In practice, the data access monitor 202 could be scaled to monitor the activity of any number of users 210. For the sake of simplicity, however, the remainder of this description focuses on only one user 210. The data access monitor 202 is suitably configured to monitor or check certain activity or behavior of the user 210, namely, activity that is associated with access to the database of interest. As explained in more detail below, the data access monitor 202 determines when the activity of the user 210 corresponds to certain data access events or objects of interest. These particular data access events may be predetermined and saved in a list or table maintained by the database system 200. Notably, routine and harmless user activities need not be watched or monitored and, therefore, the data access monitor 202 can be configured to only check for occurrences of a limited number of discrete, distinguishable, or detectable data access events.

In certain embodiments, the scoring engine 204 maintains a set of scores, counts, grades, or other suitable metric for a plurality of different monitored data access events. For example, if the data access monitor 202 keeps track of sixty different data access events for the user 210, then the scoring engine 204 preferably maintains at least sixty different scores (one score per monitored data access event). The scores could be expressed numerically, alphabetically, or using any appropriate units. Moreover, the database system 200 could use any suitable range for the scores. One non-limiting example described here uses a numerical scoring system, such that each monitored data access event has a respective numerical score associated therewith (with an initial or starting value of zero). As described in more detail below, the set of scores can be dynamically adjusted and updated as the users 210 access and manipulate the database system 200. More specifically, whenever the data access monitor 202 detects the occurrence of a triggering data access event, the scoring engine can update the set of scores (if appropriate to do so) to reflect the detection of that event.

The decision engine 206 is operatively associated with the scoring engine 204 in a way that enables the decision engine 206 to process and analyze the set of scores (or any individual score) maintained by the scoring engine 204. More specifically, the decision engine 206 compares the set of scores to a stored event activity profile for the user 210. The stored event activity profile may be a nominal profile for that particular user 210, or it could be a nominal profile for a peer group, category, class, or other group of which the user 210 is a member. For example, the database system 200 might track the activity of the user 210 based on his or her own historical behavior and/or based on his or her job title or position. Accordingly, the user 210 could be associated with a plurality of different event activity profiles, e.g., an individualized profile, a job position profile, a geographic location profile, or the like. Thus, the database system 200 may include or cooperate with a profile database 212 that maintains the event activity profiles necessary to support the various monitoring functions of the database system 200.

For the sake of brevity and simplicity, the following description focuses on an individualized event activity profile for the user 210. The nominal event activity profile represents a baseline or reference for comparison against the actual detected data access activity of the user 210. In certain implementations, the nominal event activity profile is derived from historical data access behavior of the user 210. The nominal event activity profile could be created during a training or learning period of the database system 200, before fully actually activating the user monitoring features (see FIG. 4 and related description). Thereafter, the profile could remain static or it could be adaptive in nature, dynamically responding to ongoing behavior patterns of the user 210. The profile database 212 may cooperate with the data access monitor 202 (depicted by the dashed arrow in FIG. 2) for purposes of dynamically updating the nominal event activity profiles if needed. In this regard, the profile may correspond to a moving window of time, such as the past six months, twelve months, week, etc. Accordingly, the profile can be adjusted in an ongoing manner to reflect the normal data access pattern of the user 210, which might fluctuate from day to day, week to week, quarter to quarter, year to year, or the like.

The decision engine 206 determines whether the current set of scores (maintained by the scoring engine 204) is indicative of normal user activity or abnormal, unauthorized, illegitimate, or abusive user activity. The response initiator 208 is operatively associated with the decision engine 206 in a way that allows the response initiator 208 to initiate at least one security measure or any appropriate course of action when the decision engine 206 determines that the set of scores is indicative of unauthorized data access activity. In certain embodiments, the response initiator 208 initiates a security measure, a remedial action, or a corrective action when certain characteristics of the set of scores diverge from corresponding characteristics of the nominal event activity profile by at least a threshold amount. In other words, if the current set of scores reflects abnormal, unusual, or excessive data access activity by the monitored user 210, the response initiator 208 is triggered to take appropriate action.

Figure 3:
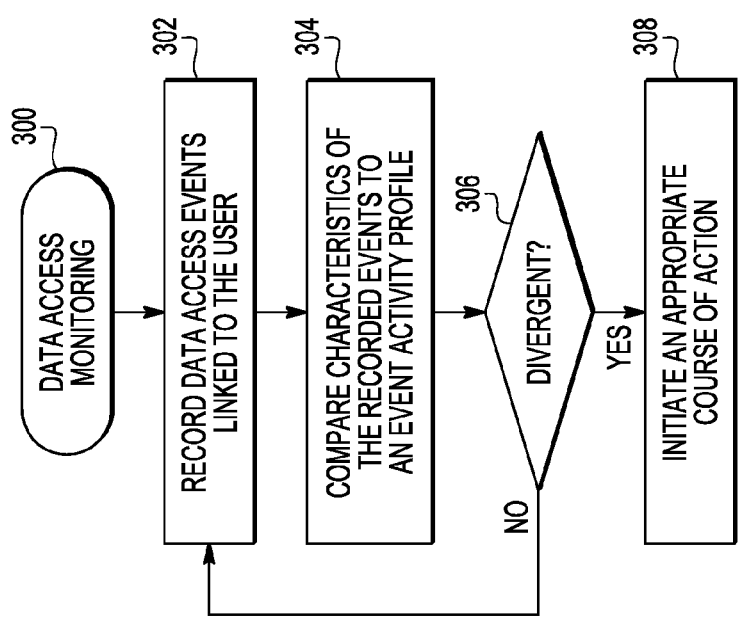
FIG. 3 is a flow chart that illustrates an exemplary embodiment of a data access monitoring process.

FIG. 3 is a flow chart that illustrates an exemplary embodiment of a data access monitoring process 300, which could be performed by the database system 200, or the multi-tenant application system 100. The various tasks performed in connection with an illustrated process may be performed by software, hardware, firmware, or any combination thereof For illustrative purposes, the following description of illustrated processes may refer to elements mentioned above in connection with FIG. 1 and FIG. 2 In practice, portions of a described process may be performed by different elements of a system, e.g., a processor, a data processing engine, or a scoring engine. It should be appreciated that a described process may include any number of additional or alternative tasks, the tasks shown in the figures need not be performed in the illustrated order, and a described process may be incorporated into a more comprehensive procedure or process having additional functionality not described in detail herein. Moreover, one or more of the tasks shown in a figure could be omitted from an embodiment of the respective process as long as the intended overall functionality remains intact.

The process 300 represents one exemplary embodiment of a computer-implemented method of monitoring user activity in a database system. Although the process 300 can be performed in parallel for any number of concurrent users, this example refers to a single monitored user. This embodiment of the process 300 begins by recording data access events associated with the user accessing data that is maintained by the database system (task 302). Notably, the monitored user may be (and typically is) an authenticated user that has legitimately logged into the host database system using his or her credentials.

Some examples of monitored data access events include, without limitation: viewing a record; exporting a record; deleting a record; printing a record; emailing a record; preparing a list of records; creating a new record; and downloading a record. The process continues by comparing certain characteristics of the recorded events (which have been recorded for a designated period of time, such as a day, a week, or a month) to corresponding characteristics of a nominal event activity profile (task 304). As mentioned above, this profile may represent average or baseline data access activity behavior of the monitored user.

The process 300 continues by checking whether the characteristics of the recorded events diverge from the nominal event profile (query task 306). If not, then the process 300 may exit or return to an appropriate point, such as task 302, for continued monitoring. If the recorded events diverge from the profile by at least some minimum amount, then the process 300 initiates an appropriate course of action (task 308). The initiated course of action may depend on a number of factors, including, without limitation: the amount by which the recorded events diverge from the profile; the sensitivity of the data accessed by the user; the status, job title, or position held by the user; the seniority level of the user; etc. Some examples of security measures, remedial actions, corrective actions, and other applicable courses of action include, without limitation: generating a security alert; sending a warning message to a supervisor of the user; limiting data access rights of the user; implementing enhanced security measures for the user; logging the user out of the system; notifying the human resources department; and printing a report.

Figure 4:
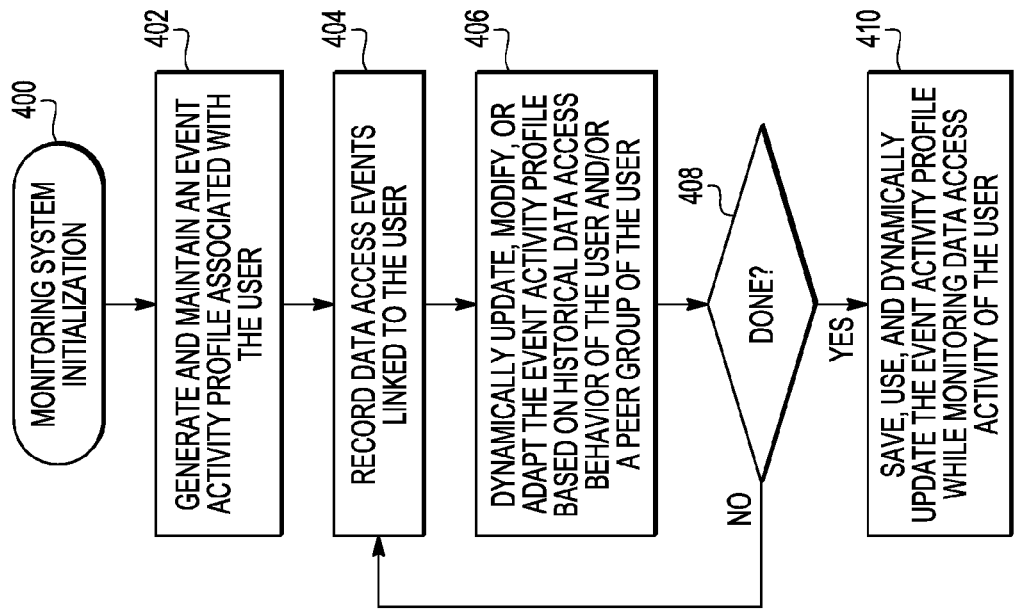
FIG. 4 is a flow chart that illustrates an exemplary embodiment of a monitoring system initialization process.

In certain implementations, a nominal event profile is prepared and updated for each user of the system. This enables the system to self-adapt to individual usage patterns and variations in data access behavior. Certain embodiments employ a training or learning period for new users (or for "reset" users) such that the system can intelligently and accurately monitor the data access activity of those users without generating an excessive amount of false alarms. In this regard, FIG. 4 is a flow chart that illustrates an exemplary embodiment of a monitoring system initialization process 400. The process 400 can be performed by the host system at any time, and for any user. In a typical deployment, the process 400 will be performed whenever a new user is introduced into the system for data access monitoring and/or whenever a new baseline profile needs to be generated for an existing user.

The initialization process 400 may begin by generating and maintaining an event activity profile associated with the user (task 402). The profile is associated with the user because it could be individually assigned to that particular user or it could instead be assigned to a group, category, class, or relationship of which that particular user is a member. This description assumes that the generated profile is individually assigned to the user. The initial state of the nominal event profile might correspond to a predetermined profile, e.g., a universal "template" that applies to all users of the system, to a subset or class of users, or to all new users of the system. A template profile may be based on a vast amount of empirical data, historical data access activity, or the like. A template profile may be desirable to expedite the training/learning period for the user. Alternatively, the initial state of the nominal event profile might represent a user with no past history. In other words, all scores, counts, grades, and/or other characteristics of interest are reset or "zeroed out" or initialized at their minimum/maximum values.

Thereafter, the process 400 monitors the user and records certain data access events that are linked to the user (task 404). In this regard, the process 400 monitors for occurrences of the data access events of interest, as described above for task 302 of the process 300. In addition, the process 400 may record data access events triggered by other users that have something in common with the particular user of interest (for example, members of the user's peer group, people having the same job title or position as the user, employees having the same seniority as the user, etc.). Next, the process 400 dynamically updates, modifies, or adapts the event activity profile in a manner that is influenced by the recorded data access events (task 406). In this regard, the nominal event activity profile can be derived from historical data access behavior of the user of interest. Alternatively or additionally, the nominal event activity profile can be derived from collective historical data access behavior of the user's peer group, the user's employee class, and/or any classification, group, or category of monitored users having some relationship or association with the user of interest.

If the process 400 has collected enough historical data (query task 408), then it will continue by saving and using the current version of the event activity profile for the user (task 410). In certain embodiments, the saved event activity profile can be dynamically updated and modified in an ongoing manner while monitoring data access activity of the user (task 410). Thus, the profile can be adaptively adjusted to reflect gradual, normal, or otherwise expected changes to the user's data access behavior, without triggering a false alarm.

Although not always required, certain implementations of the system described here use a scoring/counting methodology for tracking the data access behavior of the users. As mentioned briefly above, one exemplary technique uses a numerical counting scheme for the monitored data access events. The scheme could be implemented in a hierarchical manner. In this regard, the non-limiting embodiment described here detects and counts occurrences of user actions, records and counts data access events in response to detected user actions, scores detected data access events in an appropriate manner, and analyzes scores to determine whether or not to take any corrective or remedial actions, or to otherwise initiate any security measures.

For this example, certain triggering user actions are counted as they occur. In this regard, a number of "action" counts may be maintained for each monitored user of the system, where an action count is incremented by some amount (for example, one) for each occurrence of a specified user action. Accordingly, a single user will typically have a plurality of different and independent action counts maintained by the system. For this particular example, a given action count is increased by one whenever the system detects the occurrence of the corresponding user action. Thus, an action count may be considered to be a numerical count that indicates the number of times a specified user action takes place during a particular time period. An action count may be reset or zeroed at any time, according to the system requirements. For example, an action count may be reset once a day, once a week, once a month, etc. The frequency with which an action count is reset could vary over time, e.g., dynamically in response to user behavior, in accordance with financial or sales quarters, or in accordance with the tenure of the user.

The system could also maintain action counts for one or more groups of users. For example, a group-based action count could be used to keep track of the number of times a specified user action is detected for a designated group of users. In certain embodiments, therefore, a group-based action count might be a simple sum of the individual action counts of the users within the group. As another example, a group-based action count could be defined such that a single occurrence of a group-based action requires certain behavior (user actions) of the group itself. In other words, a group-based action count need not be calculated from the individual user action counts. In practice, a group-based action count may be maintained for any type of group, such as user peer groups, groups based on employee tenure or seniority, groups based on job position, or the like.

In certain embodiments, the system monitors for the occurrence of data access events in the manner explained above. For this example, data access events are counted as they occur, and a number of "event" counts may be maintained for each monitored user of the system, where an event count is incremented by some amount (typically one) for each occurrence of a monitored data access event. Accordingly, a single user will typically have a plurality of different and independent event counts maintained by the system. For this particular example, a given event count is increased by one whenever the system detects the occurrence of the corresponding data access event. Thus, an event count may be considered to be a raw or baseline numerical count that indicates the number of times a specified data access event takes place during a particular time period. An event count may be reset or zeroed at any time, as described above for the action counts.

It should be appreciated that a data access event may (but need not) correspond to a detected user action or a detected group-based action. In other words, the user action count for a given user action (e.g., viewing a sales report) and the event count for that user action may track each other and always be the same, unless they are reset at different times. In such situations, the system need not maintain two separate and distinct counts for that particular user action. On the other hand, a data access event may be defined such that a single occurrence of that event is based on or otherwise derived from the occurrence of more than one distinct user action or group-based user action. Accordingly, an event count for a user need not be adjusted concurrently with the lower level action counts. In such situations, the system will maintain independent counts for the fundamental user actions and for any data access event derived from a plurality of basic user actions. For example, a monitored data access event might be defined as the occurrence of ten or more user actions (e.g., downloading contact information for customers) within a designated time period (e.g., an hour). As another example, a monitored data access event might be defined as the occurrence of a first detected user action (e.g., saving a sales report) followed by the occurrence of a second detected user action (e.g., emailing the sales report).

The system could also maintain event counts for one or more groups of users. For example, a group-based event count could be used to keep track of the number of times a monitored data access event is detected among a designated group of users. In certain embodiments, therefore, a group-based event count might be a simple sum of the individual event counts of the users within the group. In other embodiments, the system might compute a group-based event count in a more complex manner In practice, a group-based event count may be maintained for any type of group, including, without limitation, any of the groups types described herein.

The system maintains scores for the various data access events monitored by the system. The score for a given data access event is based on or otherwise derived from the event count for that data access event. For example, the score might be a weighted version of the event count. It should be appreciated that an event score may (but need not) be equal to its corresponding event count. In other words, the event score could represent a non-weighted or unadjusted version of its corresponding event count. The weighting scheme enables the system administrator to assign more or less significance to certain monitored data access events and to otherwise customize the monitoring system as needed. For example, assume that the system detects the occurrence of a monitored user action (e.g., deleting a customer account). The user's action count for the action "Delete Customer Account" is incremented by one. This example assumes that the user's action count for the deleting operation is the same as the user's event count. Accordingly, the user's event count is also incremented by one. Due to the relative significance and importance of deleting a customer account, however, the user's event score for this action is incremented by fifteen. As a second example, assume that the system detects the occurrence of the user action defined as "View Recent Sales Calls" and, therefore, increments the respective user action count (and the respective user event count) by one. The system might treat the viewing of recent sales calls to be somewhat routine and innocuous and, therefore, the user's event score for this action is only incremented by two. These examples demonstrate how different user actions might be weighted and scored differently, depending on the importance, significance, potential risk, and/or other characteristics of the monitored user actions.

In certain embodiments, the monitoring system calculates and maintains one or more total, overall, and/or average scores (referred to hereinafter as "total" scores) for each monitored user, where the total scores are used to determine whether or not to initiate a course of action. For example, the total score for a user might be derived from some or all of the individual event scores of that user, e.g., a simple sum of all the event scores, an average of all the event scores, a weighted sum or average of some of the event scores, or the like. As another example, the total score for a user might consider event scores from a designated historical period of time such as the last three days, the last week, the last quarter, etc. Moreover, the total score for a user could be influenced by one or more event scores for a group in which the user is a member. The use of total scores in this manner may be desirable to reduce false alarms and to accommodate expected changes in the data access and workflow behavior of the monitored users.

The system could also maintain total counts for one or more groups of users. For example, a group-based total count could be used to determine whether the behavior of a group as a whole is suspect or should otherwise be flagged by the system. For example, a group-based total score for a group might be derived from any or all of the individual event scores for the members of the group (using any formula, algorithm, or derivation scheme). As another example, a group-based total score for a group might consider event scores collected during a designated period of time such as the last three days, the last month, the last year, or the like. In practice, a group-based total score may be maintained for any type of group, including, without limitation, any of the groups types described herein.

Figure 5:
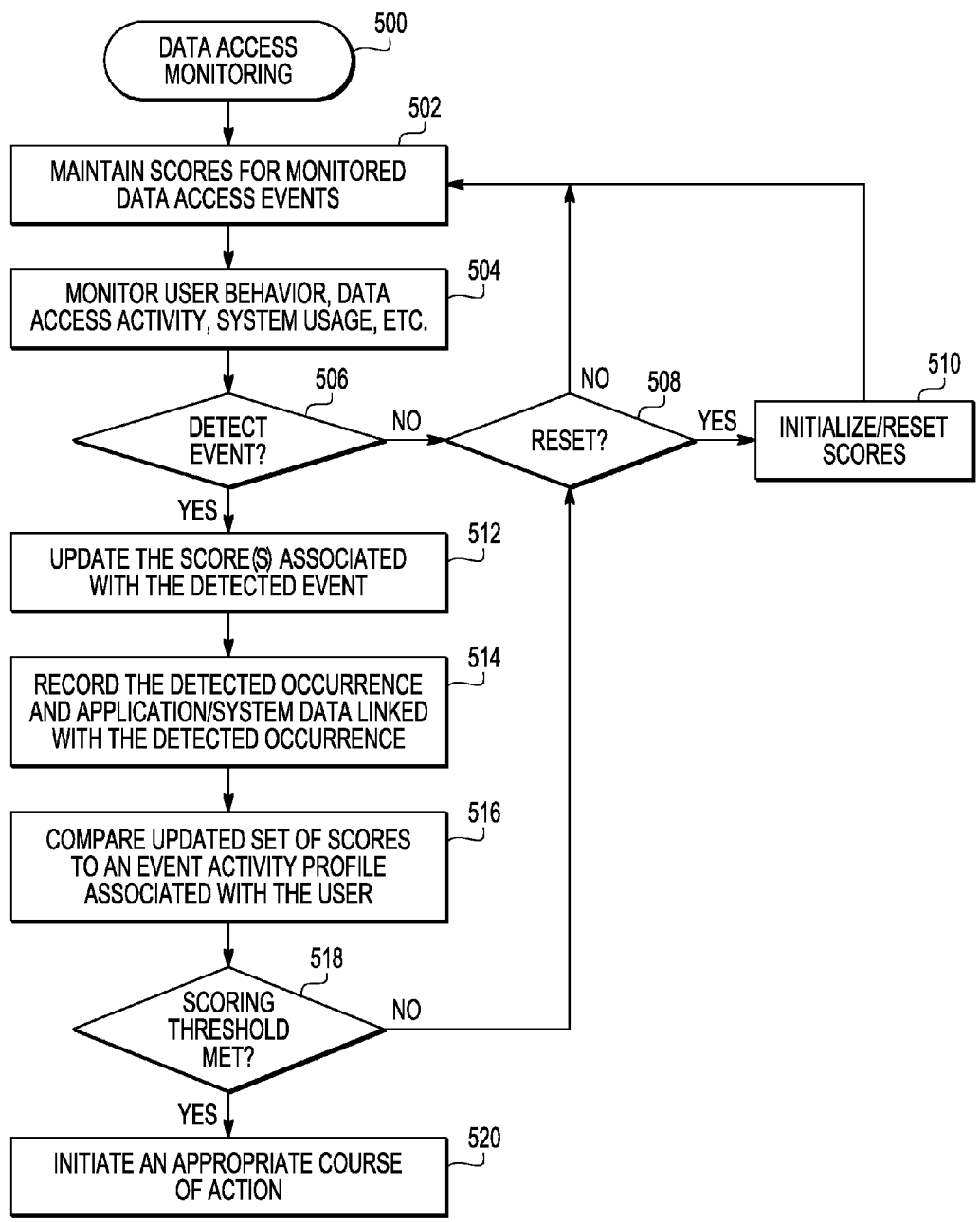
FIG. 5 is a flow chart that illustrates an exemplary embodiment of a data access monitoring process.

Referring again to the drawings, FIG. 5 is a flow chart that illustrates an exemplary embodiment of a data access monitoring process 500. The process 500 represents one exemplary embodiment of a computer-implemented method of monitoring user activity in a database system. Although the process 500 can be performed in parallel for any number of concurrent users (and can be performed for individual users and/or for groups of users), this example refers to a single monitored user. This embodiment of the process 500 begins by maintaining scores for monitored data access events (task 502). In practice, the process 500 will maintain a respective event score for each monitored data access event, as explained above. Thus, the system preferably stores a current set of scores for each monitored user.

The process 500 monitors behavior of the user (in particular, data access activity, system usage, etc.) to detect occurrences of the monitored data access events (task 504). As mentioned previously, the system could monitor fundamental or baseline user actions and analyze detected occurrences of those user actions to determine whether or not the data access events (as defined) have occurred. If the system does not detect the occurrence of a data access event of interest (query task 506), then the process 500 may check whether it is time to reset the user's scores (query task 508). If it is not time to reset, the system maintains the current set of scores and continues monitoring the user's data access activity (tasks 502, 504). If the user's scores need to be reset, then the process 500 resets or initializes the current set of scores to appropriate values (task 510) before proceeding to task 502. It should be appreciated that query task 508 and task 510 may be implemented such that the current set of scores are reset in accordance with some predetermined schedule, which may be periodic (daily, weekly, monthly, annually, etc.), non-periodic, random, or the like. In certain embodiments, task 510 initializes the respective score for each of the monitored data access events on a daily basis. For example, all of the user's event scores might be reset to zero at midnight each day.

When the process 500 detects and records the occurrence of a monitored data access event (query task 506), the system adjusts, increments, or otherwise updates the user's set of event scores to reflect the detected event (task 512). As explained above, one or more of the user's event scores and/or one or more of the user's group-based event scores could be updated at this time. Accordingly, the updated event score(s) need not always correspond to the recorded data access event that was actually detected. A straightforward embodiment will update the individual event score that corresponds to the event detected at query task 506. The embodiment described here also records the detected occurrence of the data access event (task 514). For example, the baseline user action count and/or the associated event count may be incremented and the time of the detected occurrence may be logged. In addition, application data, system data, and/or metadata that is linked or otherwise associated with the detected occurrence may be recorded at this time. The recorded information can be saved and used as desired for system diagnostics, report generation, or the like.

The process 500 continues by comparing certain characteristics of the recorded events to corresponding characteristics of an event activity profile associated with the user (task 516). For this particular example, task 516 compares the user's updated set of event scores to a scoring profile assigned to the user. Alternatively or additionally, task 516 could compare the updated set of scores to a scoring profile assigned to a peer group of the user. The process 500 is designed to determine when the user's updated set of event scores might be indicative of unauthorized, suspicious, illegitimate, illegal, or other defined data access activity. In this regard, the process checks whether the updated set of scores satisfies a scoring threshold or other criteria (query task 518). For example, query task 518 may check whether the updated set of scores diverges from the user's nominal event activity profile by at least a threshold amount. In this regard, query task 518 may determine when the updated set of scores includes at least one individual event score that exceeds a respective threshold score. As another example, query task 518 may detect when an overall score derived from the updated set of scores exceeds a respective threshold score. It should be appreciated that the particular type of scoring threshold and/or scoring criteria implemented by the process 500 may differ from the explicit examples presented here, and that these examples are not intended to limit or restrict the scope or application of the various embodiments.

Figure 6:
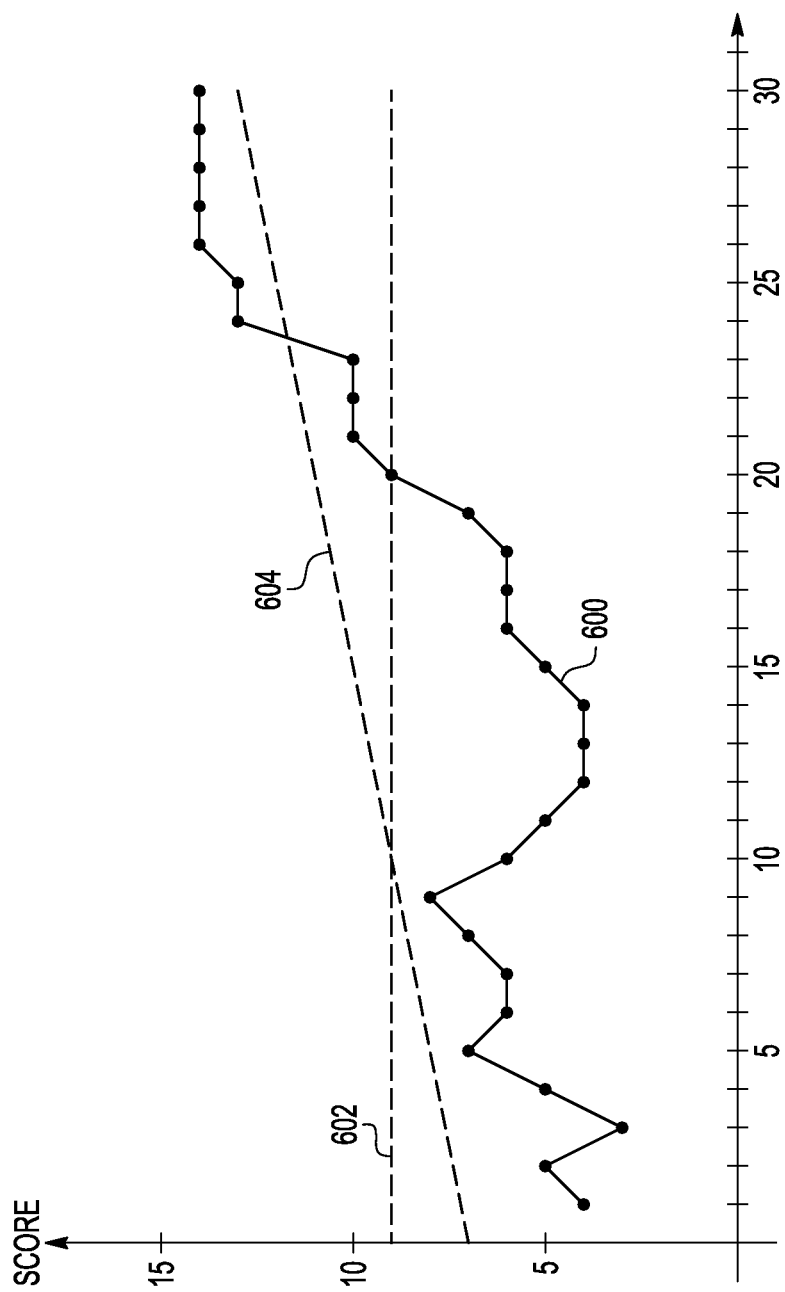
FIG. 6 is a plot that depicts variation in a data access event score over time.

FIG. 6 is a plot 600 that depicts variation in a user's actual data access event score over time. The event score may correspond to an individual user or for a group of users, although this example refers to the score for only one user. The vertical axis represents the event score for a monitored data access event, and the horizontal axis represents time (expressed in days of a month). This example assumes that the user's event score is reset (zeroed) each day. Accordingly, there could be a different event score recorded for each day of the month.

The plot 600 indicates that the user's event score remains relatively low and stable during the first half of the month, hovering at a score of about five. In contrast, the user's event score increases over the second half of the month, until it peaks at a score of fourteen at the end of the month. Whether or not the user's event score will trigger any security measures or other course of action will depend on the nominal event activity profile applied to the plot 600. For example, if the nominal event activity profile corresponds to a constant threshold value of eleven (as indicated by the threshold line 602), then the user's event score will not raise any suspicion until day 20, when the plot 600 crosses the threshold line 602. As another example, assume that the nominal event activity profile instead contemplates an increasing trend, as depicted by the profile line 604. The profile line 604, which may be based on historical trends and/or past data access patterns of the user, anticipates rising event scores as the month progresses. Nonetheless, for this example, the user's activity at day 24 will still cause the system to take some appropriate action, because at that time the plot 600 has crossed the profile line 604.

In practice, the system and the process 500 need not employ simple thresholds or simple profiles as depicted in FIG. 6. These simple examples are presented here for ease of description and understanding. Moreover, in an embodiment of the system, thresholds and/or profiles used for comparison during task 516 and query task 518 may be dynamic and adaptive in nature, may correspond to a moving reference window of time, and/or may be customized by user, group, company, etc.

Referring back to FIG. 5, if the stated scoring threshold is not met (query task 518), then the process 500 may proceed to query task 508 and continue as described above. Thus, the set of event counts for the user can be dynamically updated, checked, and reset in an ongoing manner. If, however, the scoring threshold is satisfied, then the process 500 initiates an appropriate course of action (task 520), which may include one or more of the specific remedial, corrective, or security-related actions described in more detail above.

As mentioned above, the various functions and features of the process 500 may be carried out with any sort of hardware, software and/or firmware logic that is stored and/or executed on any platform. For example, various functions shown in FIG. 5 may be implemented using software or firmware logic that is stored in the memory 106 and executed by the processor 105 as part of the application platform 110 (see FIG. 1). The particular hardware, software and/or firmware logic that implements any of the various functions shown in FIG. 5, however, may vary from context to context, implementation to implementation, and embodiment to embodiment.

The foregoing detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Thus, although several exemplary embodiments have been presented in the foregoing description, it should be appreciated that a vast number of alternate but equivalent variations exist, and the examples presented herein are not intended to limit the scope, applicability, or configuration of the invention in any way. To the contrary, various changes may be made in the function and arrangement of the various features described herein without departing from the scope of the claims and their legal equivalents.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In this regard, it should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a tangible processor-readable medium, which may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, or the like.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A computer-implemented method of monitoring user activity in a database system comprising a processor and a memory element, the method comprising:
   maintaining, by the processor and the memory element, a plurality of different daily scores for a plurality of different monitored data access events, resulting in a set of daily scores for a user, wherein each of the monitored data access events has a respective one of the daily scores associated therewith, and wherein each of the monitored data access events is associated with user access to a respective data object maintained by the database system;
   detecting, by the processor, occurrences of the monitored data access events associated with the user accessing data objects maintained by the database system;
   recording, by the processor, the occurrences of the monitored data access events, resulting in recorded events;
   in response to each recorded event, adjusting the set of daily scores for the user to obtain an updated set of daily scores for the user, wherein adjusting the set of daily scores is performed by the processor;
   calculating an aggregate daily score from the updated set of daily scores, wherein the aggregate daily score indicates risk sensitivity of the monitored data access events;
   comparing, by the processor, the aggregate daily score to a corresponding threshold score defined by a scoring profile maintained for the user; and
   initiating, by the processor, a course of action when the aggregate daily score diverges from the corresponding threshold score.

2. The method of claim 1, wherein:
   the database system comprises a multi-tenant customer relationship management (CRM) system; and
   the user is an authenticated user of the multi-tenant CRM system.

3. The method of claim 1, further comprising deriving, by the processor, the scoring profile from historical data access behavior of the user.

4. The method of claim 1, further comprising deriving, by the processor, the scoring profile from collective historical data access behavior of a peer group of the user.

5. The method of claim 1, further comprising dynamically updating the scoring profile in response to ongoing data access behavior of the user, wherein the dynamically updating is performed by the processor.

6. A computer-implemented method of monitoring data access activity of a user of a database system comprising a processor and a memory element, the method comprising:
   maintaining, by the processor and the memory element, a plurality of different daily scores including a respective daily score for each of a plurality of monitored data access events, resulting in a set of daily scores for the user, wherein each of the monitored data access events is associated with user access to a respective data object maintained by the database system;
   monitoring, by the processor, behavior of the user to detect occurrences of the monitored data access events;
   updating, by the processor, the set of daily scores in response to detected occurrences of the monitored data access events, resulting in an updated set of daily scores;
   calculating an aggregate daily score from the updated set of daily scores, wherein the aggregate daily score indicates risk sensitivity of the monitored data access events;
   initiating, by the processor, a course of action when the updated set of scores is indicative of unauthorized data access activity.

7. The method of claim 6, further comprising recording, by the processor, the detected occurrences of the monitored data access events, along with application data linked with the detected occurrences of the monitored data access events.

8. The method of claim 6, further comprising comparing, by the processor, the aggregate daily score to a corresponding threshold score defined by a nominal event activity profile associated with the user, wherein initiating the course of action is performed when the aggregate daily score diverges from the corresponding threshold score by at least a threshold amount.

9. The method of claim 8, further comprising deriving, by the processor, the nominal event activity profile from historical data access behavior of the user.

10. The method of claim 6, wherein the course of action comprises an action selected from the group consisting of: generating a security alert; sending a warning message to a supervisor of the user; limiting data access rights of the user; implementing enhanced security measures for the user; logging the user out of the system; notifying the human resources department; and printing a report.

11. The method of claim 6, wherein the monitored data access events comprise events selected from the group consisting of: viewing a record; exporting a record; deleting a record; printing a record; emailing a record; preparing a list of records; and downloading a record.

12. A database system comprising:
one or more processors;
a data storage system coupled to the one or more processors to store data objects accessible by a user;
a data access monitor implemented by the one or more processors and operatively associated with the data storage system, wherein the data access monitor checks activity of the user associated with access to the data objects stored by the database;
a scoring engine implemented by the one or more processors and operatively associated with the data access monitor, wherein the scoring engine maintains a plurality of different daily scores as a set of daily scores for a plurality of monitored data access events, wherein each of the monitored data access events has a respective one of the daily scores associated therewith, wherein each of the monitored data access events is associated with user access to a respective one of the data objects stored by the data storage system, and wherein the scoring engine calculates an aggregate daily score from the set of daily scores, such that the aggregate daily score indicates risk sensitivity of the monitored data access events;
a decision engine implemented by the one or more processors and operatively associated with the scoring engine, wherein the decision engine compares the aggregate daily score to a corresponding threshold score defined by a nominal event activity profile for the user; and
a response initiator implemented by the one or more processors and operatively associated with the decision engine, wherein the response initiator initiates at least one security measure when the decision engine determines that the aggregate daily score diverges from the corresponding threshold score by at least a threshold amount.

13. The database system of claim 12, wherein the nominal event activity profile is derived from historical data access behavior of the user.

* * * * *